May 5, 1942.　　　R. V. WETZSTEON　　　2,282,014
CONTROL MEANS FOR VACUUM HEATING SYSTEMS
Filed Dec. 20, 1939　　　3 Sheets—Sheet 1

Inventor:
Raymond V. Wetzsteon,
By Potter, Pierce & Scheffler,
Attorneys.

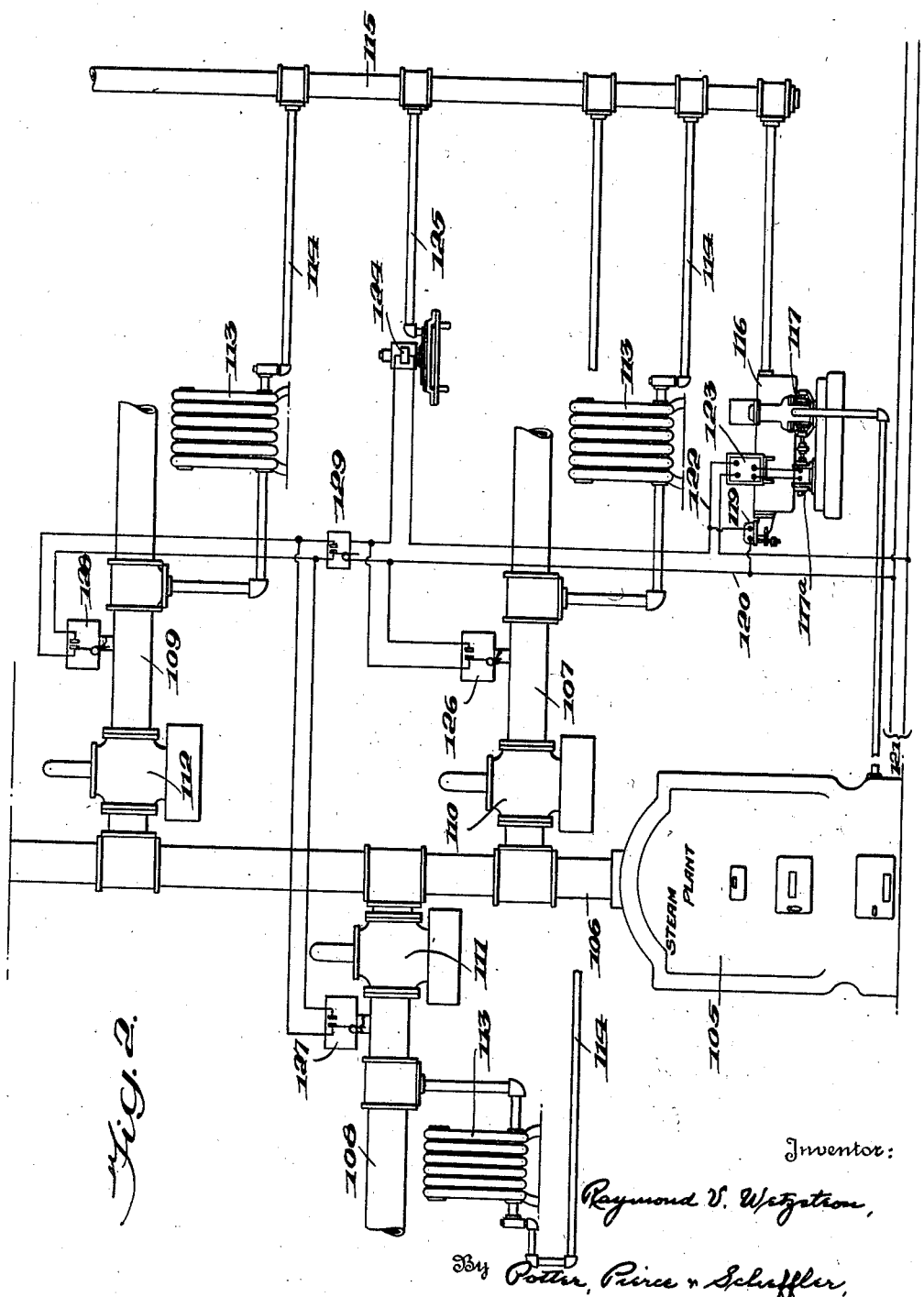

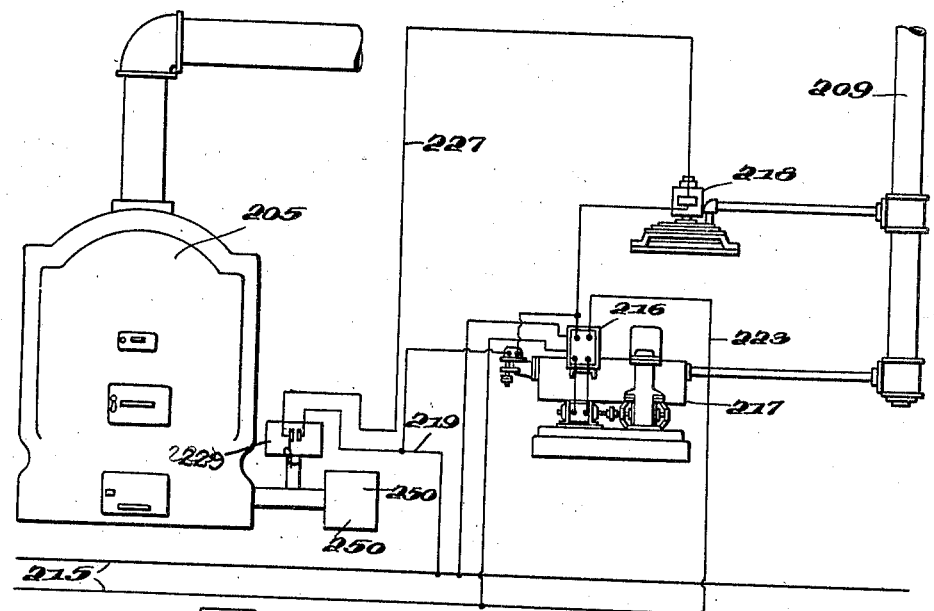
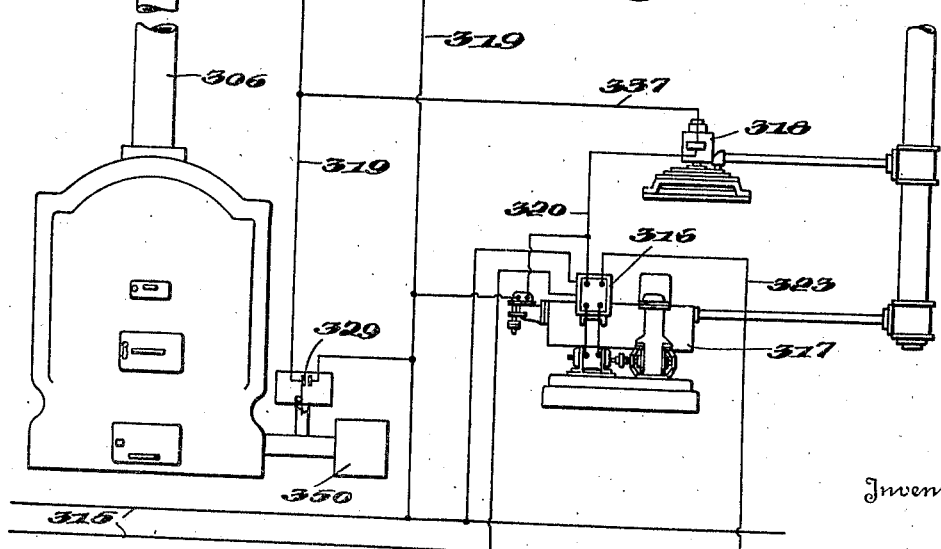

Patented May 5, 1942

2,282,014

UNITED STATES PATENT OFFICE 2,282,014

CONTROL MEANS FOR VACUUM HEATING SYSTEMS

Raymond V. Wetzsteon, Butte, Mont.

Application December 20, 1939, Serial No. 310,228

7 Claims. (Cl. 237—9)

The present invention relates to control means for vacuum heating systems of the type in which steam is supplied on one side, a return pipe is provided on the other side and a vacuum pump is connected to the return side.

In prior systems of this type, the operation of the vacuum pump is usually under control of means responsive to vacuum conditions in the return side of the system and means responsive to the level of the liquid in a condensate collection chamber. In such systems, the controls for the vacuum heating pumps usually comprise a float operated switch and a vacuum-controlled switch wired in parallel to control the starting and stopping of the motor of the vacuum pump. Thus conditions in the system must be such that both controls must be satisfied before the motor will be turned off and either control will turn the motor on.

Conventional systems as described above have the disadvantage that if a leak develops in the system or if the vacuum pump loses its prime, it will run continuously without pumping a vacuum when there is no steam on the system.

A primary object of the present invention is to provide a vacuum heating system including a vacuum pump and vacuum responsive control means therefor in which means are provided for rendering said vacuum responsive control means inoperative to start said pump except under a predetermined operating condition of the steam supply side of the system.

Another object of the present invention is to provide a control system for vacuum heating systems wherein the vacuum control means will be rendered inoperative to start the vacuum pump when there is no steam on the system and will be rendered operative to control the pump motor to maintain the desired degree of vacuum when steam is on the system.

Another object of the invention is to provide a control system for vacuum heating systems including vacuum control means combined with means responsive to boiler operation for rendering said vacuum control means inoperative to start the vacuum pump except when certain predetermined boiler operating conditions are satisfied.

Another object of the invention is to provide a control system for vacuum heating systems of the type including a boiler, a steam supply side fed from said boiler, a return side and a vacuum pump connected to said return side, in which said control system includes means responsive to vacuum conditions in said return side for starting said vacuum pump and means responsive to operation of said boiler and to the presence of steam in said supply side for rendering said vacuum responsive means inoperative to start the vacuum pump except when said boiler is in operation or steam is present in said supply side.

Other objects and advantages of the invention will be apparent from the following detailed description of the invention taken in connection with the accompanying drawings illustrating preferred embodiments thereof.

In the drawings:

Fig. 2 is a diagrammatic view of a zoned vacuum heating system embodying the invention;

Fig. 3 is a diagrammatic illustration of a vacuum heating system embodying a modified control system according to the invention; and Fig. 4 is a diagrammatic illustration of a vacuum heating system embodying another modification.

Figure 1:
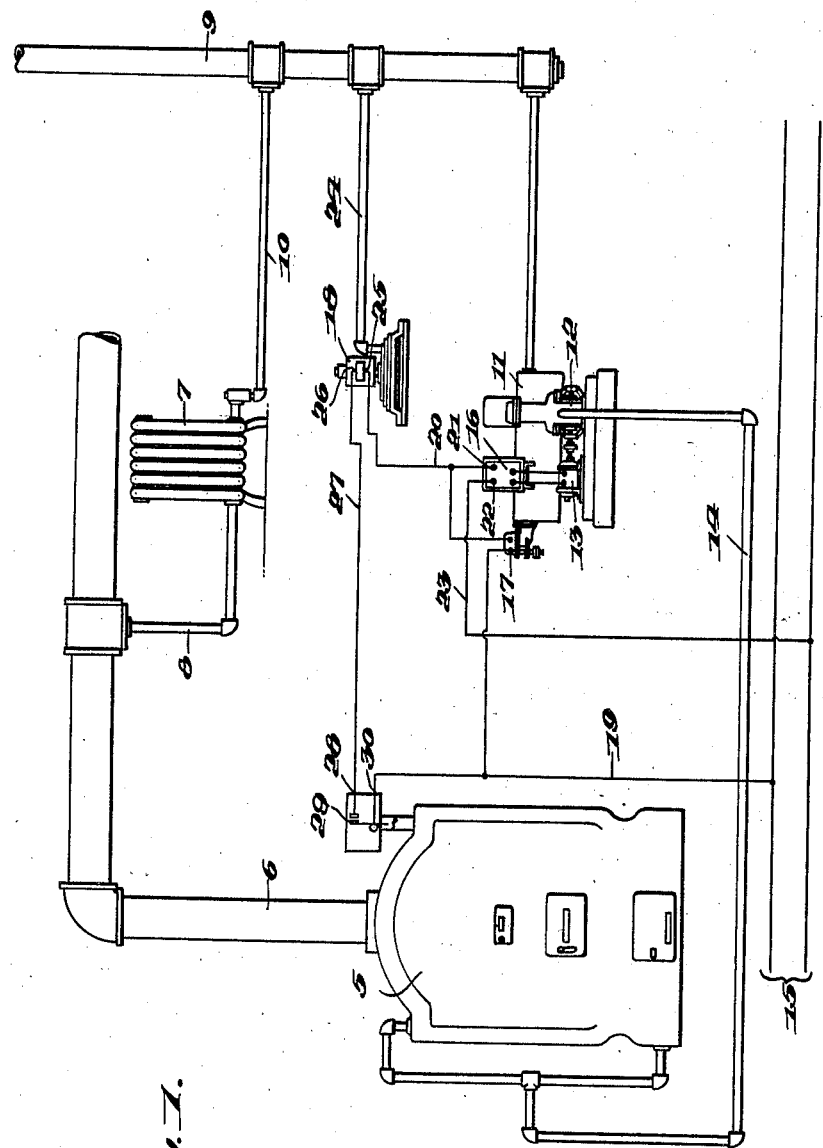
Fig. 1 is a diagrammatic illustration of a vacuum heating system embodying the invention.

Referring now to the form of the invention disclosed in Fig. 1, 5 indicates a steam boiler from which a steam main 6 leads to supply steam to radiators 7 through connections 8. The radiators (only one of which is shown) are connected to a return line 9 by connections 10, in the usual manner. The return line 9 leads to the receiving tank 11 of a vacuum heating pump unit including the combination air and water pump 12. The pump 12 is operated by an electric motor 13 and a condensate return line 14 leads from the pump to the boiler 5.

Power for the motor operating and control circuits is taken from a power line 15 and the motor is under control of a standard magnetic coil type starter switch 16.

The starter switch 16 is controlled by a float switch 17 and a vacuum responsive switch 18. The float switch 17, which is preferably mounted on the receiving tank 11 and responsive to the level of liquid in the tank, is connected across lead 19 from one side of the power line 15 and return lead 20 connected to one terminal 21 of the starter switch 16. The other terminal 22 of the starter switch 16 is connected by lead 23 to the other side of the power line 15.

The vacuum responsive switch 18, which for convenience may also be mounted on the pump unit 12, is connected by a line 24 to the condensate return pipe 9. This switch is in parallel with the float-operated switch 17, one terminal 25 being connected to the lead 20 and the other terminal 26 thereof being connected by lead 27 to one terminal 28 of a temperature or pressure responsive switch 29 mounted on the boiler 5. The other terminal 30 of the switch 29 is connected to the lead 19 from the line 15.

It will be seen that the temperature or pressure responsive switch 29 is in series with the vacuum-controlled switch 18 so that the latter can operate the motor starter switch 16 of the vacuum pump unit only when there is sufficient steam pressure in the boiler and supply mains to result in closing of the temperature or pressure responsive series switch 29.

In the system illustrated in Fig. 2, steam generated in the plant 105 is supplied to a zoned heating system through supply main 106. The zone mains 107, 108 and 109 are connected to the supply main 106 and are provided with zone control valves 110, 111 and 112, respectively, which may be either manually or automatically controlled, as desired. Each of the zone mains has radiators 113 connected thereto, these having return lines 114 connecting to a return main 115 leading to the receiving tank 116 of a vacuum heating pump unit 117 operated by an electric motor 117a.

While only a single return main is shown for purposes of illustration, it will be understood that as many returns as are necessary for the layout of the system will be provided and that more than one vacuum heating pump unit may also be employed.

In the zoned system a float-controlled switch 119 is connected between lead 120 from one side of the power line 121 and lead 122 connected to one terminal of the motor starter switch 123. A vacuum-controlled switch 124, connected to the return main 115 by line 125, is connected in parallel with the float-operated switch 119 and is in series with pressure or temperature responsive switches 126, 127 and 128 located in the respective zone mains 107, 108 and 109 behind the zone control valves thereof. The switches 126, 127 and 128 are in parallel with respect to each other, each being connected across the lead 120 from one side of the line 121 and lead 129 from the vacuum switch.

It will be seen that the presence of steam in any one of the zone mains will result in completion of the circuit between one side of the line 121 and the vacuum-controlled switch so that the latter can control the vacuum pump motor in response to vacuum conditions in the return main 115 irrespective of whether one or all of the heating zones are placed in operation.

As stated above, the series switches 29 and 126—128 may be either thermostatic or pressure responsive so long as they are operative to complete the control circuit when steam is on the system and to break the control circuit when there is no steam pressure on the supply side of the system.

It will be understood that the temperature or pressure responsive series switches may be situated anywhere on the supply side of the system, such as in the supply main and that the control system is applicable to systems where steam is supplied from a distributing main furnished with steam from a central generating plant.

In the form of the invention illustrated in Fig. 3, a vacuum-controlled switch 218, responsive to conditions in the return line 209, leading to vacuum heating pump unit 217, is in series through lead 227 with a burner responsive switch 229 connected by lead 219 to one side of the power line 215. The vacuum switch 218 is connected by lead 220 to one terminal of the motor starter switch 216, the other terminal of which is connected by lead 223 to the other side of the line 215.

The burner responsive switch may be one of various types, depending upon what type of burner 250 is used for firing the boiler 205, the only essential being that the switch be operative to close the circuit therethrough when the burner 250 is in operation and to open the same when the burner is out of operation. Where electric controls are used to operate the firing equipment, the switch 229 could be solenoid operated and have its operating circuit closed by the burner switch or the switch could be operated by air or gas pressure or in a variety of ways not deemed necessary to describe here.

According to this system, the vacuum-controlled switch will be rendered operative to start the vacuum pump whenever the boiler firing mechanism 250 is in operation, since the series switch 229 will be closed as soon as firing commences and will remain closed as long as the burner is in operation.

In the system illustrated in Fig. 4, a vacuum-controlled switch 318, responsive to vacuum conditions in the return line 309, leading to vacuum pump unit 317, is connected in series with a temperature or pressure responsive switch 327, responsive to the pressure of steam in the boiler and steam main 306, and a burner responsive switch 329, responsive to operation of the firing equipment 350. The switches 327 and 329 are in parallel with respect to each other, each being connected on one side to lead 319 from one side of the power line 315 and on the other side to lead 337 from the vacuum switch 318. The vacuum switch 318 is connected by lead 320 to one terminal of the motor starter switch 316, the other terminal of which is connected to the other side of the line 315 by lead 323.

In this system, the vacuum-controlled switch 318 will be rendered operative to start the vacuum pump whenever the firing equipment is turned on, so as to pump the air out of the system. As soon as steam is generated in the boiler and is passing to the supply main 306, the switch 327 makes contact and retains the vacuum-controlled switch operative even though the burner 350 ceases operation. Thus, as long as either steam is present in the supply side, or the firing equipment is in operation, the vacuum switch remains operative to start the vacuum pump to maintain the desired vacuum on the system.

The switch 327 may be responsive to either temperature or pressure and the switches 229 and 329 may be electrically operated or pressure operated, depending on the type of firing equipment employed. The structure of these switches is unimportant so long as they are operative to complete the circuit therethrough under the desired conditions.

It will be seen that the invention provides for control of the vacuum responsive switch circuit in response to an operating condition of the steam supply side of the system, that is responsive either to boiler burner operation or the presence of steam pressure in the boiler or supply mains.

Although preferred embodiments of the invention have been shown and described by way of illustration, it will be understood that various additional modifications are contemplated and may be practiced without departing from the spirit of the invention within the scope of the appended claims.

I claim:

1. In a vacuum heating system comprising a supply side including a steam boiler, supply mains and firing means for said boiler, and a return side including a vacuum pump connected therewith, a control circuit for said vacuum pump comprising switch means responsive to the degree of vacuum in the return side, switch means responsive to operation of said firing means and switch means responsive to the presence of steam in said supply mains, means cooperating with said latter two switch means and said control circuit for conditioning the circuit to render said vacuum responsive switch operative to start said vacuum pump when said firing means is in operation or when steam is present in said supply mains.

2. In a vacuum heating system comprising a supply side, a return side and a vacuum pump connected to the return side; a control circuit for said vacuum pump comprising a vacuum-controlled switch responsive to the degree of vacuum in said return side, and supervisory switch means comprising a plurality of supervisory switches in parallel with each other and responsive to different operating conditions in the supply side of the system, said supervisory switch means being in series with said vacuum-controlled switch whereby the vacuum pump may be put in operation by said vacuum-controlled switch only when the control circuit is closed through at least one of said supervisory switch.

3. A system as defined in claim 2 wherein the supply side of said vacuum heating system includes a boiler and a burner for firing the same, and one of said supervisory switches is responsive to operation of said burner to close when said burner is in operation.

4. In a vacuum heating system including a steam supply main, a plurality of zone mains connected to said supply main, zone valves in each of said zone mains controlling the admission of steam thereto from said supply main, a return main and a vacuum pump connected to said return main; a control circuit for said vacuum pump comprising a vacuum-controlled switch responsive to the degree of vacuum in said return main, a switch means associated with each of said zone mains responsive to the presence of steam in said zone mains, said last mentioned switch means being connected in series with said vacuum-controlled switch and in parallel with respect to each other, whereby the presence of steam in any one of said zone mains will result in closing of the associated switch means to condition said control circuit and render said vacuum-controlled switch operative to control said vacuum pump.

5. In a vacuum heating system including a steam supply main, a plurality of zone mains connected to said supply main, zone valves in each of said zone mains controlling the admission of steam thereto from said supply main, a return main and a vacuum pump connected to said return main; a control circuit for said vacuum pump comprising a vacuum-controlled switch responsive to the degree of vacuum in said return main, a switch means associated with each of said zone mains responsive to the presence of steam in said zone mains, said last mentioned switch means being connected in series with said vacuum-controlled switch and in parallel with respect to each other, whereby the presence of steam in any one of said zone mains will result in closing of the associated switch means to condition said control circuit and render said vacuum-controlled switch operative to control said vacuum pump, a condensate return tank, and a float-controlled switch means responsive to the level of condensate in said tank and connected in parallel with said vacuum-controlled switch whereby to effect independent control of said vacuum pump by said float-controlled switch means.

6. In a vacuum heating system comprising a supply side including a boiler and a burner for firing said boiler, a return side and a vacuum pump connected to said return side, a control circuit for said vacuum pump including switch means responsive to the degree of vacuum in the return side and switch means responsive to operation of said burner to close when said burner is in operation, said switch means being connected in series whereby said vacuum responsive switch means is inoperative to start said vacuum pump except during operation of said burner.

7. In a vacuum heating system comprising a supply side including a boiler, a burner for firing said boiler and a steam supply main, a return side and a vacuum pump connected to said return side, a control circuit for said vacuum pump including switch means responsive to the degree of vacuum in said return side, switch means responsive to operation of said burner to close when said burner is in operation and switch means responsive to the presence of steam in said supply main, said last two mentioned switch means being connected in series with said first mentioned switch means and in parallel with respect to each other whereby said vacuum responsive switch means is rendered operative to start said vacuum pump when said burner is in operation or when steam is present in said supply main.

RAYMOND V. WETZSTEON.